US012671941B2

(12) United States Patent
Nagel et al.

(10) Patent No.: US 12,671,941 B2
(45) Date of Patent: Jun. 30, 2026

(54) ANALYSIS AND OPTIMIZATION OF AN AUDIO SIGNAL

(71) Applicant: Shure Acquisition Holdings, Inc., Niles, IL (US)

(72) Inventors: Michael Shane Nagel, Skokie, IL (US); Bryan Lee Jozwiak, Bartlett, IL (US); Matthew John McCracken, Lombard, IL (US); June Won, Chicago, IL (US); Dean Komrska, Buffalo Grove, IL (US); Soren Christian Pedersen, Chicago, IL (US); Ross Penniman, Morton Grove, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 232 days.

(21) Appl. No.: 18/325,772

(22) Filed: May 30, 2023

(65) Prior Publication Data

US 2023/0396924 A1 Dec. 7, 2023

Related U.S. Application Data

(60) Provisional application No. 63/348,787, filed on Jun. 3, 2022.

(51) Int. Cl.
*H04R 3/04* (2006.01)
*G06F 3/16* (2006.01)
*H04R 1/04* (2006.01)

(52) U.S. Cl.
CPC .............. *H04R 3/04* (2013.01); *G06F 3/165* (2013.01); *H04R 1/04* (2013.01); *H04R 2430/01* (2013.01)

(58) Field of Classification Search
CPC ........ H04R 3/04; H04R 1/04; H04R 2430/01; H04R 3/005; H04R 2420/01; H04R 3/00;
(Continued)

(56) References Cited

U.S. PATENT DOCUMENTS 7,085,613 B2 8/2006 Pitman et al.
7,613,532 B2 11/2009 Anderson et al.
(Continued)

FOREIGN PATENT DOCUMENTS

EP 1401243 A1 3/2004
WO 2011139502 A1 11/2011

OTHER PUBLICATIONS

Sep. 4, 2023—(WO) International Search Report and Written Opinion—App PCT/US2023/023954.
Nov. 28, 2025—(EP) Office Action—App. No. 23733547.6.

*Primary Examiner* — Akelaw Teshale
(74) *Attorney, Agent, or Firm* — Banner & Witcoff, Ltd.

(57) ABSTRACT

Methods and apparatuses for automatic analysis and optimization of an audio signal are described herein. An example method may comprise receiving, by an audio signal optimizer, a first indication to perform an audio signal optimization, receiving an audio signal from an input device, recording a sample of the audio signal, analyzing the sample of the audio signal for at least one audio parameter, and performing, based on an analysis of the sample of the audio signal, the audio signal optimization of the audio signal, wherein the audio signal optimization comprises a configuration of a gain level of the audio signal.

20 Claims, 9 Drawing Sheets

(58) Field of Classification Search
CPC ...... H04R 29/008; H04R 3/12; H04R 1/1083; H04R 2499/13; H04R 1/406; H04R 29/001; G06F 3/165
See application file for complete search history.

(56) References Cited

U.S. PATENT DOCUMENTS

| | | | |
|---|---|---|---|
| 7,742,609 | B2 | 6/2010 | Yeakel et al. |
| 7,844,452 | B2 | 11/2010 | Takeuchi et al. |
| 7,864,967 | B2 | 1/2011 | Takeuchi et al. |
| 7,957,966 | B2 | 6/2011 | Takeuchi |
| 8,280,076 | B2 * | 10/2012 | Devantier ............... H04S 7/302 |
| | | | 381/103 |
| 8,886,344 | B2 | 11/2014 | Radford et al. |
| 9,031,243 | B2 | 5/2015 | LeBoeuf et al. |
| 9,160,294 | B2 | 10/2015 | Allen |
| 9,219,460 | B2 * | 12/2015 | Bush ........................ H04R 3/00 |
| 9,293,127 | B2 | 3/2016 | Serletic |
| 9,357,306 | B2 | 5/2016 | Tammi et al. |
| 9,532,139 | B1 | 12/2016 | Lu et al. |
| 9,577,596 | B2 * | 2/2017 | Ray ........................ H03G 5/165 |
| 9,716,962 | B2 | 7/2017 | Nackvi |
| 9,952,825 | B2 * | 4/2018 | Sheen ..................... G06F 3/165 |
| 10,028,055 | B2 | 7/2018 | Nackvi |
| 10,075,800 | B2 | 9/2018 | Sladeczek et al. |
| 10,135,413 | B2 | 11/2018 | Christoph et al. |
| 10,477,335 | B2 | 11/2019 | Tammi et al. |
| 10,516,914 | B2 * | 12/2019 | Sprenger .......... H04N 21/47202 |
| 10,542,367 | B2 | 1/2020 | Daly |
| 10,884,696 | B1 | 1/2021 | Willis et al. |
| 10,893,363 | B2 | 1/2021 | Choisel et al. |
| 11,251,763 | B2 * | 2/2022 | Xu ........................... G06F 3/165 |
| 11,277,689 | B2 * | 3/2022 | Zabel ................... G10L 21/0316 |
| 12,307,161 | B1 * | 5/2025 | Liao ........................ G06F 3/165 |
| 2002/0018573 | A1 | 2/2002 | Schwartz |
| 2005/0240395 | A1 * | 10/2005 | Wiser ...................... H04S 3/008 |
| | | | 704/201 |
| 2011/0160883 | A1 * | 6/2011 | Yasuda .................... H04R 3/14 |
| | | | 700/94 |
| 2014/0003625 | A1 * | 1/2014 | Sheen ................... H03G 5/165 |
| | | | 381/103 |
| 2015/0117685 | A1 * | 4/2015 | Reiss ...................... H04R 5/04 |
| | | | 381/300 |
| 2017/0373777 | A1 | 12/2017 | Channegowda |
| 2018/0032611 | A1 | 2/2018 | Cameron et al. |
| 2018/0109837 | A1 * | 4/2018 | Sprenger .......... H04N 21/47202 |
| 2019/0182591 | A1 | 6/2019 | Delacoux |
| 2021/0191686 | A1 * | 6/2021 | Fuchs .................... H03F 3/181 |
| 2021/0266667 | A1 * | 8/2021 | Zabel ................. G10L 21/0316 |
| 2021/0329405 | A1 * | 10/2021 | Eubank .................. G06F 3/011 |
| 2021/0357174 | A1 * | 11/2021 | Beiser ................... G10L 25/18 |

* cited by examiner

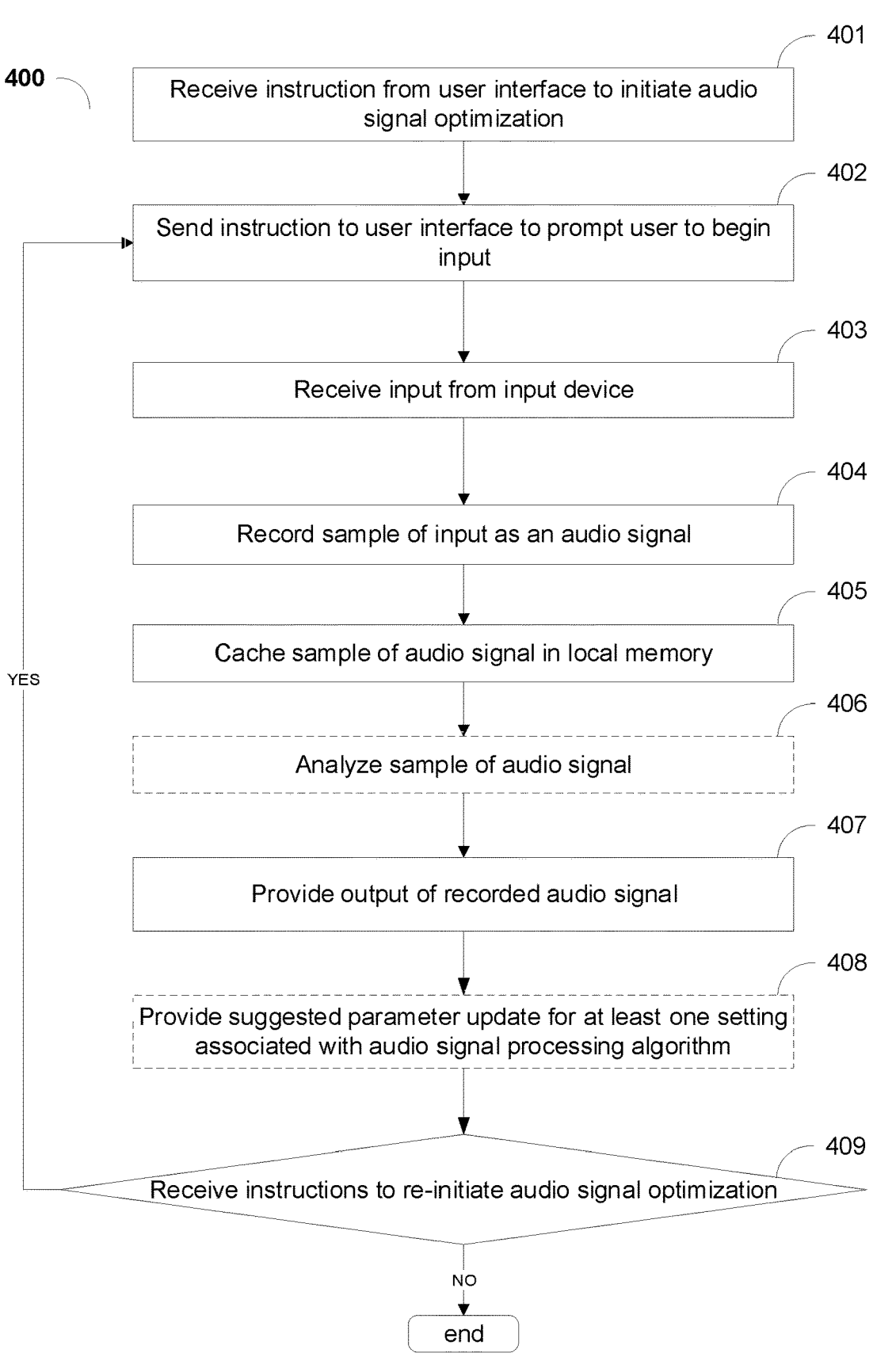

400

401
Receive instruction from user interface to initiate audio signal optimization 402
Send instruction to user interface to prompt user to begin input 403
Receive input from input device 404
Record sample of input as an audio signal 405
Cache sample of audio signal in local memory 406
Analyze sample of audio signal 407
Provide output of recorded audio signal 408
Provide suggested parameter update for at least one setting associated with audio signal processing algorithm 409
Receive instructions to re-initiate audio signal optimization

YES

NO end

FIG. 4

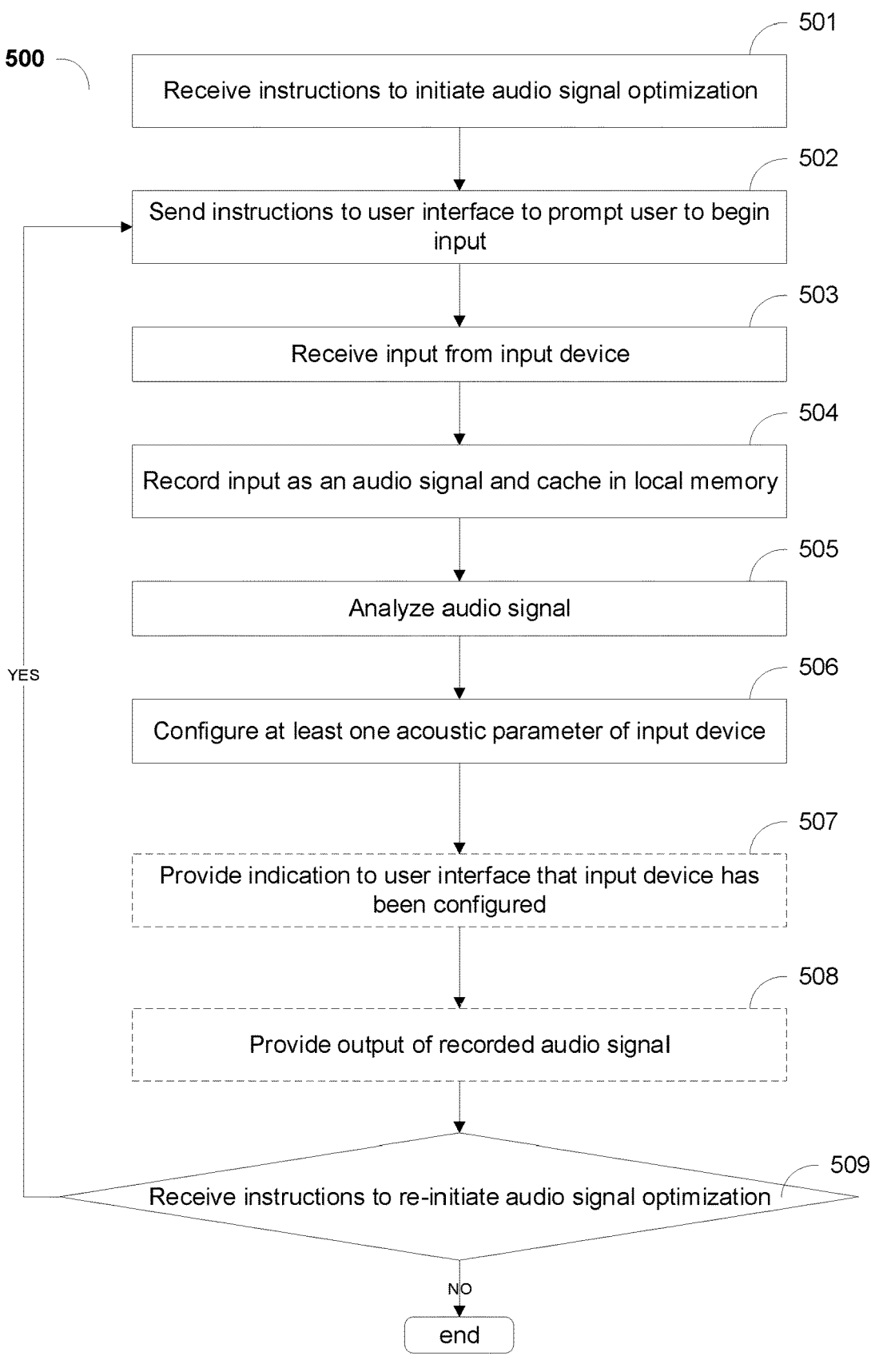

500

501
Receive instructions to initiate audio signal optimization

502
Send instructions to user interface to prompt user to begin input

503
Receive input from input device

504
Record input as an audio signal and cache in local memory

505
Analyze audio signal

506
Configure at least one acoustic parameter of input device

507
Provide indication to user interface that input device has been configured

508
Provide output of recorded audio signal

509
Receive instructions to re-initiate audio signal optimization

YES

NO end

FIG. 5

ANALYSIS AND OPTIMIZATION OF AN AUDIO SIGNAL

CROSS-REFERENCE TO RELATED APPLICATION

This application claims priority to U.S. Provisional Patent Application No. 63/348,787, filed on Jun. 3, 2022, which is hereby incorporated by reference in its entirety.

FIELD

Aspects described herein generally relate to audio signal processing, and/or hardware and/or software related thereto. More specifically, one or more aspects described herein provide for the automatic optimization of an audio signal.

BACKGROUND

A variety of audio and/or combined audio/video applications, such as podcasting, streaming, and/or live recording scenarios, may require advanced knowledge of acoustic theory to attain a high-quality audio signal. At least some applications may require an expeditious process of configuring signal processing equipment to attain a high-quality audio signal. With the rising popularity of various services using audio, there is an increasing demand for improvements in audio quality that can be achieved with relatively simple processes and with relatively low-cost equipment.

SUMMARY

The following presents a simplified summary of the disclosure in order to provide a basic understanding of some aspects of the disclosure. This summary is not an extensive overview of the disclosure. It is not intended to identify key or critical elements of the invention or to delineate the scope of the invention. The following summary merely presents some concepts of the disclosure in a simplified form as a prelude to the more detailed description provided below.

In many instances, podcasters, broadcasters, audio streamers, recording artists, and the like might not be familiar with audio engineering techniques. Example of audio techniques may involve parameters, characteristics, and/or operations such as loudness, k-weighted, relative to full scale (LKFS) thresholds, parametric equalization, compression, limiting, or noise gating. It may be difficult to attain a desired vocal recording without a working knowledge of various audio techniques. Additionally, the increasing accessibility and portability of equipment, such as used for podcasting, live streaming, and/or other recording, may allow a user to perform in various acoustic environments. However, depending on the application, a user might not have sufficient time and/or equipment to properly configure audio processing settings to attain a desired audio quality.

As described in more detail herein, this application sets forth methods, algorithms, apparatuses, and systems for automatically analyzing an audio signal, automatically configuring audio signal processing modules based on the analysis of the audio signal, and applying the configured audio signal processing modules to continued and/or future audio signals. These methods, algorithms, apparatuses, and systems may be helpful in enabling a user to quickly perform a sound check of his or her audio equipment. in a number of different acoustic environments (e.g., indoors, outdoors, near noisy or quiet locations) before the user begins to live stream, broadcast, podcast, and/or record audio.

An example method may comprise receiving, by an audio signal optimizer, a first indication to perform an audio signal optimization, receiving an audio signal from an input device, recording a sample of the audio signal, analyzing the sample of the audio signal for at least one audio parameter, and performing, based on an analysis of the sample of the audio signal, the audio signal optimization of the audio signal, wherein the audio signal optimization comprises a configuration of a gain level of the audio signal.

An example apparatus may comprise one or more processors and memory storing instructions that, when executed by the one or more processors, cause the apparatus to initiate, based on a first indication, an audio signal optimization, receive an audio signal from an input device, record a sample of the audio signal, analyze the sample of the audio signal for at least one audio parameter associated with the sample of the audio signal; and perform, based on an analysis of the sample of the audio signal, the audio signal optimization, wherein the audio signal optimization comprises a configuration of a gain level of the audio signal.

These as well as other novel advantages, details, examples, features and objects of the present disclosure will be apparent to those skilled in the art from following the detailed description, the attached claims and accompanying drawings, listed herein, which are useful in explaining the concepts discussed herein.

BRIEF DESCRIPTION OF THE DRAWINGS

Some features are shown by way of example, and not by limitation, in the accompanying drawings. In the drawings, like numerals reference similar elements.

FIG. 4 illustrates an example flow chart of a method that may be performed to implement one or more illustrative aspects described herein.

FIG. 5 illustrates another example flow chart of a method that may be performed to implement one or more illustrative aspects described herein.

DETAILED DESCRIPTION

In the following description of the various examples, reference is made to the accompanying drawings, which form a part hereof, and in which is shown by way of illustration various examples in which aspects may be practiced. References to "embodiment," "example," and the like indicate that the embodiment(s) or example(s) of the invention so described may include particular features, structures, or characteristics, but not every embodiment or example necessarily includes the particular features, structures, or characteristics. Further, it is contemplated that certain embodiments or examples may have some, all, or none of the features described for other examples. And it is to be understood that other embodiments and examples may be utilized and structural and functional modifications may be made without departing from the scope of the present disclosure.

Unless otherwise specified, the use of the serial adjectives, such as, "first," "second," "third," and the like that are used to describe components, are used only to indicate different components, which can be similar components. But the use of such serial adjectives is not intended to imply that the components must be provided in given order, either temporally, spatially, in ranking, or in any other way.

Also, while the terms "front," "back," "side," and the like may be used in this specification to describe various example features and elements, these terms are used herein as a matter of convenience, for example, based on the example orientations shown in the figures and/or the orientations in typical use. Nothing in this specification should be construed as requiring a specific three dimensional or spatial orientation of structures in order to fall within the scope of the claims.

Figure 1:
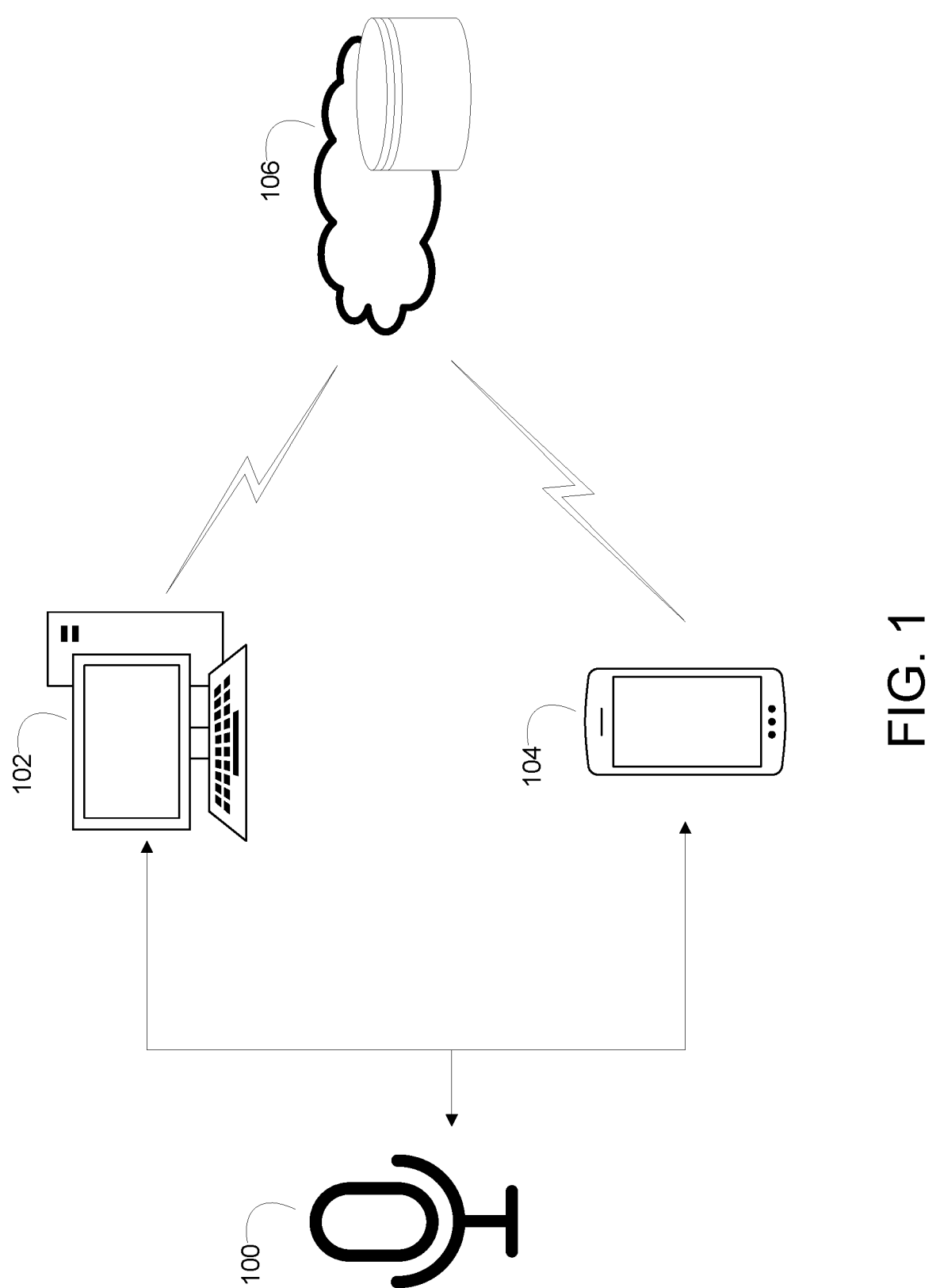
FIG. 1 illustrates an example system architecture that may be used to implement one or more illustrative aspects described herein.

FIG. 1 illustrates one example of a system architecture that may be used to implement one or more illustrative aspects described herein in a standalone and/or networked environment. Device 100 may be a microphone, including any number of microphone types, such as a condenser microphone (e.g., including large- and small-diaphragm and electret condenser), a dynamic microphone (e.g., including moving coil and ribbon microphones), or a MEMS microphone, among others. Device 100 may be a smartphone microphone (such as that of smartphone 104), a desktop or laptop microphone (such as that of desktop 102), a headset microphone, or any other microphone that may be connected to and/or in communication with a device (such as devices 102 and 104). Any one or more of devices 100, 102, 104, and 106 may be any type of known computer or server. Device 102 may be a desktop computer. Device 104 may be a smartphone or tablet. In some examples, devices 102 and 104 may include a user interface, including a graphical user interface, to allow a user to interact with the system. Device 106 may be a data server, including a cloud-based data server. Devices 100, 102, 104, and 106 may be interconnected via wide area network (WAN), such as the Internet. Other networks may also or alternatively be used, including local area networks (LAN), wireless networks, personal networks (PAN), and the like. Devices 100, 102, 104, and 106 and other devices (not shown) may or might not be communicatively connected to one or more of the networks via twisted pair wires, coaxial cable, fiber optics, radio waves, or other communication media.

Figure 2:
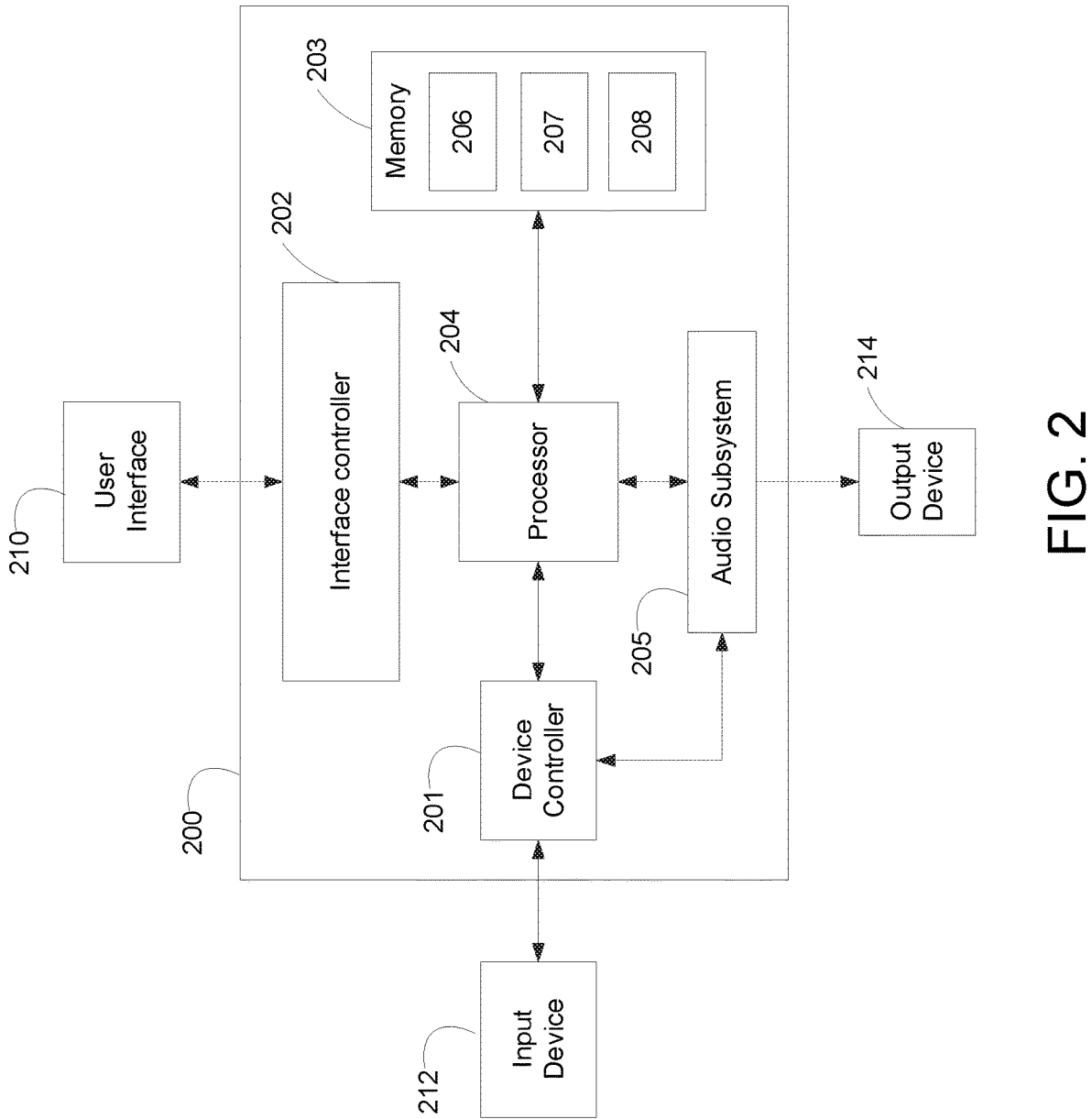
FIG. 2 illustrates an example block diagram of an example audio signal optimizer that may be used to implement one or more illustrative aspects described herein.

FIG. 2 illustrates an example audio signal optimizer that may be used to implement one or more illustrative aspects described herein. Audio signal optimizer 200 may include a processor 204 for controlling overall operation of the audio signal optimizer 200. Audio signal optimizer 200 may further include memory 203. Memory 203 may store operating system software 206 for controlling overall operation of the audio signal optimizer 200 and/or control logic 207 for instructing the audio signal optimizer 200 to perform aspects described herein. Functionality of the control logic 207 may refer to operations or decisions made automatically based on rules coded into the control logic 207, made manually by a user providing input into the system, and/or a combination of automatic processing based on user input (e.g., queries, data updates, user-selected DSP modes, a list of input devices previously setup with the software application, etc.). Memory 203 may store data used in performance of one or more aspects described herein, including at least one database 208. Memory 203 may also store other data. For example, where the memory 203 is part of the input device 212, the memory 203 may store its operating system and/or the software application that performs aspects described herein, user preferences such as preferred DSP modes, a list of input devices (such as microphone 100, among others) previously setup with the software application, communication protocol settings, and/or data supporting any other functionality of the input device 212.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Python, Perl, PUP, Ruby, JavaScript, and the like. The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

With further reference to FIGS. 1 and 2, the audio signal optimizer 200 may be implemented in any one or more of devices 100, 102, 104, and/or 106, as well as (or alternatively) in one or more additional devices (not shown). Aspects described herein may be operational with numerous other general purpose and/or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, an input device 212 (such as microphone 100) may be in communication with a device controller 201. The device controller 201 may facilitate interaction from the input device 212 to the audio signal optimizer 200. Analog and/or digital audio may be transmitted from the input device 212 to the device controller 201. Digital data may be transmitted bidirectionally (from the input device 212 to the device controller 201, and/or from the device controller 201 to the input device 212). The input device 212 may include, for example, one or more universal serial bus (USB) connectors, one or more external line return (XLR) connectors, one or more power connectors, and/or any other type of data and/or power connectors suitable for transporting signals such as power, digital data (including digital audio signals), and/or analog audio signals to and from the input device 212. Where the connection is wired, the device controller 201 may further comprise a data interface (not shown) for communicating with input device 212. For example, the data interface may comprise a USB interface or an XLR interface While several wired connections are discussed between the device controller 201 and input device 212, other types of wired or wireless connections may be used. For example, the connection between the device controller 201 and input device 212 may instead be a wireless connection, such as a Wi-Fi connection, a Bluetooth connection, a near-field connection (NFC), and/or an infrared connection. Where the connection is wireless, the device controller 201 and input device 212 may include a wireless communications interface.

A user interface 210 may be in communication with an interface controller 202. The interface controller 202 may facilitate communication between a user interface 210 and the audio signal optimizer 200. For example, the interface controller 202 may receive user indications and/or queries from user interface 210 and provide the indications and/or queries to the audio signal optimizer for further actions described herein. The user interface 210 may comprise, for example, a capacitive-touch interface that a user may control via touch (e.g., by tapping and/or sliding the user's finger), or a graphical user interface. Input device 212 may provide the user interface 210. In another example, devices 102 and 104 may provide the user interface 210. In yet another example, a software application installed on input device 212, device 102, and/or device 104 may provide the user interface 210. The user interface 210 may include a plurality of virtual selection means capable of allowing a user to selectively configure certain audio signal processing algorithm modules (FIG. 3b). The user interface 210 may further include virtual selection means indicative of one or more pre-configured DSP mode settings. User interface 210 may be configured to transmit mode setting signal 312 to audio subsystem 205 (FIG. 3b). User interface 210 may include a virtual selection means indicative of initiating an audio signal optimization (e.g., a virtual button that reads "sound check" or the like).

Audio signal optimizer 200 may include audio subsystem 205. Audio subsystem 205 may be responsible for routing and processing audio and digital signals representing audio. Audio subsystem 205 may additionally route processed audio and digital signals representing processed audio to an output device 214. Output device 214 may be any type of speaker(s). In an example, output device 214 may be the internal speakers of devices 102 or 104. In another example, output device 214 may be a personal monitoring device. In yet another example, output device 214 may be any number of speaker types that may be connected to devices 102 or 104, including studio reference speakers, PA speakers, and the like.

Any of the circuitry in FIG. 2 may be implemented, for example, as a programmable gate array (PGA), as a MOS integrated circuit (IC) chip, an application specific integrated circuit (ASIC), a digital signal processing (DSP) chip, a complex programmable logic device (CPLD) or a field-programmable gate array (FPGA) chip. The ASIC could contain a transistor, such as a FET. Any of the circuitry in FIG. 3a may be incorporated into a single MOS integrated circuit (IC) chip, an application specific integrated circuit (ASIC), a DSP chip, a complex programmable logic device (CPLD) or a field-programmable gate array (FPGA) chip. Any of the operations described herein may be implemented with hardware, software, and/or a combination thereof.

Figure 3A:
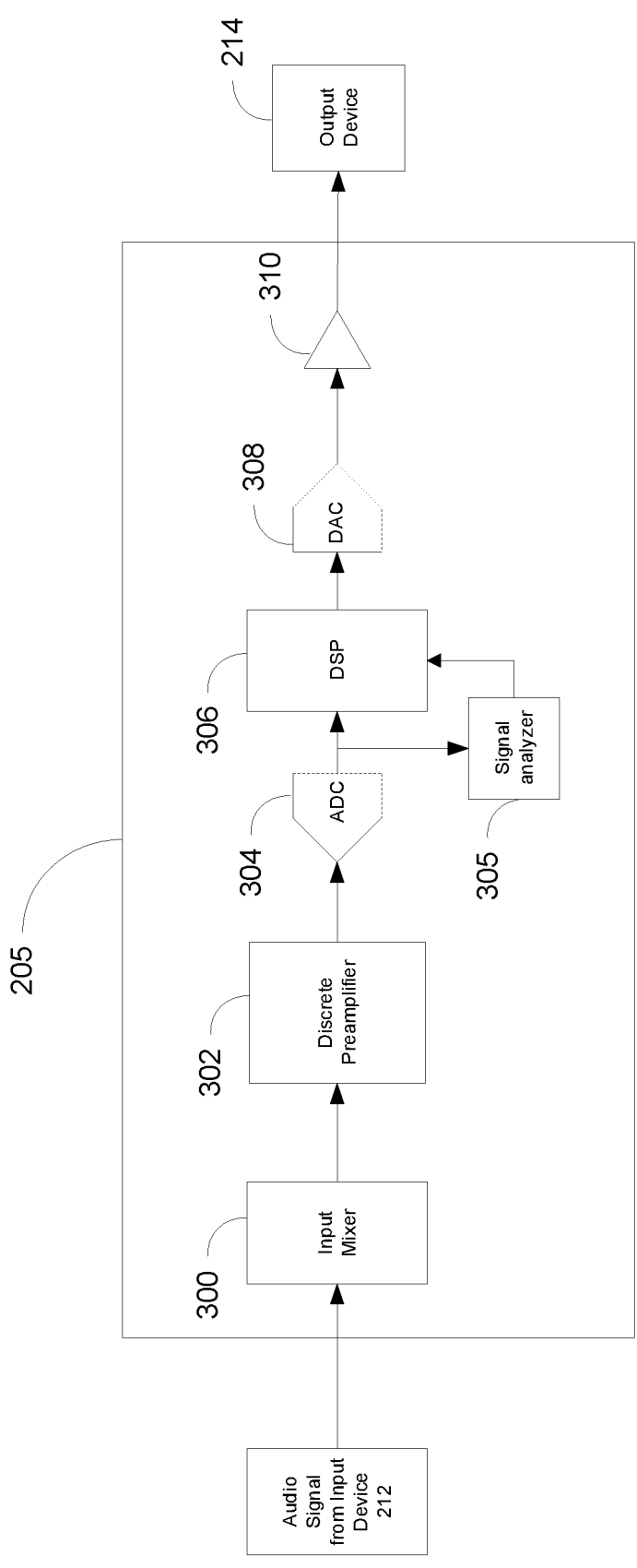
FIG. 3*a* illustrates an example audio subsystem of the audio signal optimizer of FIG. 2.
Figure 3B:
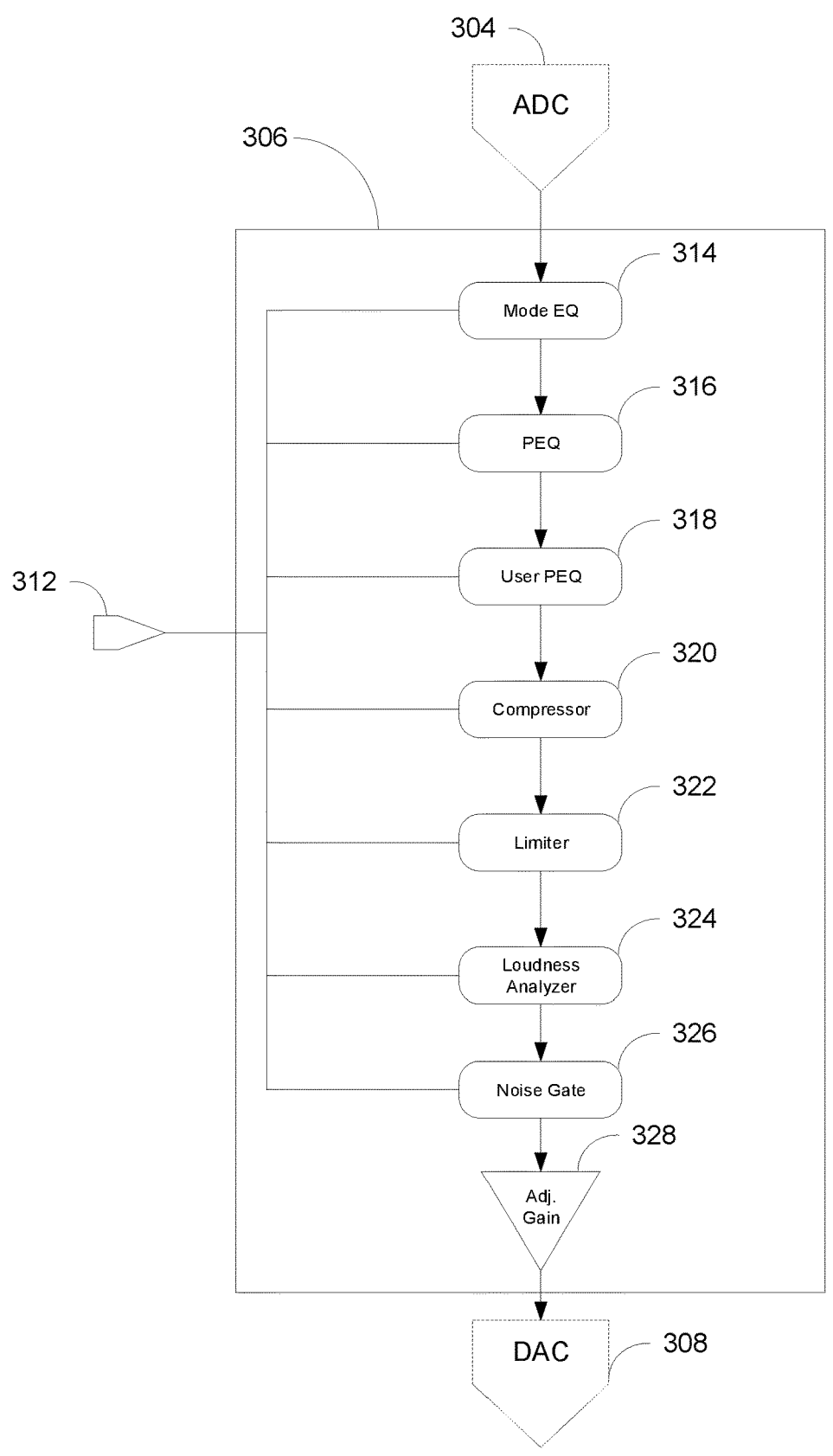
FIG. 3*b* illustrates an example block diagram of one or more portions of the example audio subsystem of FIG. 3*a*, including details of at least a portion of an example digital signal processor.

FIG. 3a illustrates an example audio subsystem 205 of the audio signal optimizer 200. Audio subsystem 205 may further include circuitry such as input mixer 300, amplifier 302 (e.g., adjustable gain amplifiers and/or discrete preamplifiers), analog-to-digital converters (ADCs) 304, signal analyzer 305, digital signal processor (DSP) 306, digital-to-analog converters (DACs) 308, data interfaces such as an I2C interface (not shown), audio interfaces such as a serial I2S interface (not shown), and gain stage 310, interconnected as shown in FIG. 3a. As indicated in FIG. 3a, an audio path may exist from input device 212 (as analog audio signals), through input mixer 300, through amplifier 302, digitized by ADC 304 to generate digital audio signals, through DSP 306, and then ultimately provided as DSP-processed PCM digital audio data to be transmitted to an output device, such as output device 214. ADC 304 may be able to simultaneously accept, for example, dual microphone inputs, a combination of microphone input and line input, or dual line inputs (e.g., two channels in each of these situations). Digital audio and/or other data may be transmitted bidirectionally (from audio subsystem 205 to device controller 201, and/or from device controller 201 to audio subsystem 205) via the I2S connection. Any of the circuitry in FIG. 3a may be implemented, for example, as a programmable gate array (PGA), as a MOS integrated circuit (IC) chip, an application specific integrated circuit (ASIC), a DSP chip, a complex programmable logic device (CPLD) or a field-programmable gate array (FPGA) chip. The ASIC could contain a transistor, such as a FET. Any of the circuitry in FIG. 3a may be incorporated into a single MOS integrated circuit (IC) chip, an application specific integrated circuit (ASIC), a DSP chip, a complex programmable logic device (CPLD), or a field-programmable gate array (FPGA) chip.

FIG. 3b illustrates an example block diagram of one or more portions of an example audio signal optimizer 200, including details of at least a portion of the DSP 306. DSP 306 may include, for example, one or more algorithm modules for processing audio, including for example one or more equalizers such as a mode equalizer (EQ) 314, a parametric equalizer (PEQ) 316, and/or a user-defined parametric equalizer (User PEQ) 318, a compressor 320, a limiter 322, a loudness analyzer 324, a noise gate 326, and/or an adjustable gain stage 328. DSP 306 may include fewer or more audio processing algorithm modules, including a de-noiser module.

DSP 306 may include one or more types of equalizers. Mode equalizer 314 may be configured to operate as an application-specific EQ. For instance, it may be desirable for a user to select an equalization profile (i.e., a target curve) with pre-configured parameters based on whether the audio input are vocals or depending on the instrument type, for example, kick drums, guitar, keyboard, etc. Parametric equalizer 316 may have a predetermined target curve. Alternatively, parametric equalizer 316 may be static. The target curve of parametric equalizer 316 may be determined with an analysis of mastered recordings across many genres.

Processor 204 may direct signal analyzer 305 to analyze an audio signal from input device 212 to determine whether the predetermined curve is applicable to the audio signal by analyzing whether a given number of frequency bands would need to be boosted or attenuated beyond a certain threshold in order to reach the target curve. If the number of frequency bands that may require boosting or attenuation exceed a given threshold, the processor 204 may apply a static parametric equalizer 316, boosting below a predetermined frequency range and above a predetermined frequency range by various amounts. For example, parametric equalizer 316 may boost or attenuate below 150 Hz and above 8000 Hz by amounts ranging from −3 dB to 6 dB. In other examples, the parametric equalizer 316 may boost or attenuate below and above other frequencies by various amounts. Based on determining that the curve of the audio signal from input device 212 is a candidate for further configuration, processor 204 may direct signal analyzer 305 to analyze each frequency band as follows: The processor may determine the amount of gain to be applied to the audio signal in that frequency band to reach the target curve. If the required gain is more than a predetermined threshold value, the content in that region may be noise. If the required gain is above a 12-dB boost, the content in that region may be noise, in which case the gain for that frequency band may be set to zero. In other examples, the predetermined threshold value may be above or below 12-dB. If the required gain for that frequency band is less than a predetermined threshold value, but more gain is needed than a predetermined maximum boost or cut value, the predetermined maximum gain for the frequency band may be applied. If the required gain for a given frequency band is less than a 12-dB boost or cut, but more gain is needed than the maximum boost or cut (i.e., around 6 dB), the maximum gain for that frequency band may be set. In other examples, the threshold value may be more or less than 12-dB and the maximum boost or cut value may be more or less than 6 dB Otherwise, the determined gain may be applied to a given frequency band based on the analysis of the audio signal. In an example, DSP 306 may include a user-defined parametric equalizer 318. Via user interface 210, a user may manually customize the target curve of user-defined parametric equalizer 318.

DSP 306 may include a compressor 320. Compressor 320 may be a feedforward log domain level detector compressor. Compressor 320 may utilize a two-state auto-release and may include a fixed set of auto-release parameters. The first 4 dB of gain reduction may be accompanied by a release time of 700 ms. Further, the remaining gain reduction may be accompanied by a release time of 30 ms. The threshold of compressor 320 may be set by using the standard deviation of the portions of the audio signal that are above a static loudness threshold in order to determine the dynamic nature of the audio signal. The compressor 320 may be configured with various settings corresponding to compression parameters such as attack, minimum and maximum thresholds, compression ratio, frequency, range, hold time, release time, etc. These settings may be automatically configurable or configurable by the user. The compressor 320 may be configured with the following settings: 10-15 ms in attack; minimum threshold of −15 to −19 dB; maximum threshold of −15 to −11 dB; and a compression ratio of 3:1 to 4:1. In other examples, the compressor 320 may be configured with attack settings above or below 10-15 ms; minimum threshold above or below −15 to −19 dB; maximum threshold above or below −15 to −11 dB; and a compression ratio of greater or less than 3:1 or 4:1.

DSP 306 may include a limiter 322, for example, which may help ensure that the audio signal does not clip. Limiter 322 may utilize several different topologies. Limiter 322 may include a limiting stage that is a soft limiter. Limiter 322 may function as a feedforward log compressor with auto release. The compression ratio of limiter 322 may be set with a very high value (i.e., 100:1). In another example, limiter 322 may include a limiting stage that is a frame-based hard limiter. Limiter 322 may utilize both example topologies in combination.

DSP 306 may include a loudness analyzer 324. The loudness analyzer 324, or the signal analyzer 305, may analyze the loudness of the audio signal in accordance with the ITU-R BS.1770-4 standard for assessing loudness, K-weighted, relative to full scale (LKFS). In operation, the loudness analyzer 324 may analyze discrete frames of the audio signal to determine whether certain frames rise above a predetermined static threshold as well as a dynamic threshold based on loudness that rises above the predetermined static threshold. Based on the analysis, the loudness analyzer 324 may apply a perceptual weight to each channel of the audio signal and then may determine the mean square power of the perceived loudness. Based on the loudness determination, the loudness analyzer 324 may automatically apply a fixed gain to the output audio signal in order to reach a predetermined target LKFS level. Predetermined target LKFS levels may include various ranges. Predetermined target LKFS levels may range from about −23 LKFS to about −12 LKFS. In other examples, predetermines target LKFS levels may range from less than −23 LKFS to greater than −12 LKFS.

DSP 306 may include an adjustable gain stage 328. Gain staging is a way of adjusting the gain of an amplifier based on the desired output signal level. By adjusting the input gain, the gain stage module 328 may provide a way to maintain a desirable (e.g., maximize) the signal to noise ratio of the audio output. The gain stage setting may be set to, for example, particular values of the parameters attack, hold, decay, maximum gain, and/or target gain, each depending upon which of the plurality of DSP modes is selected. Each of the modules 314-328 may be embodied, for example, as physical dedicated circuitry and/or as software executed by one or more processors such as processor 204.

DSP 306 may be configured to operate in a plurality of general and application-specific DSP modes. General and/or application-specific modes may include dynamic range compression, frequency dependent signal compression, limiting, and other various compression modeling. DSP 306 may also be configured to operate as an application-specific EQ. For instance, it may be desirable for a user to select (as indicated by mode setting signal 312) an equalization profile with pre-configured parameters based on the instrument type, for example, kick drums, guitar, or vocals, etc.

Based on the mode setting signal 312 and/or such other signals, DSP 306 may configure itself, including configuring some or all of modules 314-328. Each mode may have one or more settings that are adjustable within the mode, either manually by the user or automatically and dynamically by DSP 306 itself without the need for manual intervention.

Some users may have a working understanding of audio engineering techniques and may wish to manually configure audio processing algorithm modules 314-328. A user may wish to manually configure the modules 314-328 based on receiving a playback of a recorded sample of an audio signal generated by input device 212. A user may wish to receive an indication of a suggested configuration of one audio processing algorithm module or a suggested configuration of multiple audio processing algorithm modules.

FIG. 4 illustrates an example flow chart of a method 400 that may be performed. Some or all of the steps may be performed by an audio signal optimizer 200 housed in input device 212 (such as the microphone 100), and some or all of the steps may be performed by an audio signal optimizer 200 housed in a device connected to the microphone 100 (such as devices 102 or 104). Processor 204 coupled to memory 203 may control the overall operation of the audio signal optimizer 200 as it performs steps 401-409. While the method shows particular steps in a particular order, the method may be further subdivided into additional sub-steps, steps may be combined, steps may be omitted, and the steps may be performed in other orders without necessarily deviating from the concepts described herein. Steps illustrated by a dotted line indicate that the steps may be optionally performed without necessarily deviating from the concepts described herein.

In operation, the interface controller 202 may receive an indication from user interface 210 to initiate an audio signal optimization (step 401, FIG. 4). The audio signal optimizer 200 may then send instructions to user interface 210 to prompt the user to begin input from input device 212 (step 402). The audio signal optimizer 200 may then receive input from input device 212 via device controller 201 as an analog or digital audio signal (step 403), and may record a sample of the audio signal (step 404) and cache the sample of the audio signal in memory 203 (step 405). Input device 212 may be a microphone. Input device 212 may be any number of devices, such as, for example, a cloud-based server, a hard drive, a mixing console, any number of instruments, etc. The audio signal may be generated by a user speaking into the microphone or playing an instrument into the microphone. The audio signal from input device 212 may be a digital audio signal stored in, for example, devices 102, 104, and/or 106. The audio signal may be digitized by audio subsystem 205 and may be cached in database 208 as a digital audio signal, as the case may be.

Signal analyzer 305 of audio subsystem 205 may then optionally analyze the sample of the audio signal for a predetermined audio parameter or a set of audio parameters (step 406). "Audio parameter(s)" as used herein refers to a particular characteristic of the audio signal that may correspond to audio signal processing algorithm modules 314-328. For example, the audio subsystem 205 may perform a fast Fourier transform on the sample of the audio signal to translate the waveform of the audio signal into a frequency spectrum, thus providing a frequency curve that may be further configurable by parametric equalizers 314, 316, and/or 318. Signal analyzer 305 may also analyze signal loudness, among other audio parameters.

The audio signal optimizer 200 may also analyze a particular audio parameter based on a mode-setting signal 312 that is based on a user-selectable DSP mode. For example, the user interface 210 may present a user with virtual selection means indicative of one or more preconfigured, user-selectable DSP mode settings, including "podcast," "instrument," "vocals," "bass boost," "bass cut," and other DSP mode settings. In an example, the user may select "podcast" DSP mode. The user selection may cause the interface 210 to transmit a mode setting signal 312 to the audio subsystem 205 indicative of the "podcast" DSP mode settings. Memory 203 may include preconfigured audio parameter profiles that correspond to a given mode setting signal 312. For example, based on receiving a "podcast"

mode setting signal, the audio subsystem 205 may configure algorithm modules 314-328 corresponding to input devices 212, 702, and/or 703 (FIG. 7) with preconfigured parametric equalization, compression, gain, noise gate, etc., settings that may be appropriate for a podcasting setting, such as configuring the parametric equalization to enhance a user's voice, etc. Additionally or alternatively, based on receiving a "podcast" mode setting signal 312, the audio subsystem 205 may configure the loudness analyzer 324 to automatically apply a fixed gain to the output audio signal in order to reach a predetermined target LKFS level. The predetermined target LKFS level may correspond to standards for a given platform (e.g., radio broadcast and/or audio streaming applications such as Spotify, Pandora, Apple Podcasts, etc.)

Memory 203 may additionally include preconfigured audio parameter profiles that correspond to input device types, irrespective of user selection. The audio signal optimizer may detect the input device type and apply the corresponding preconfigured audio parameter profile. Alternatively (or additionally), the user interface 210 may present a user with virtual selection means indicative of one or more instrument or microphone types. In an example, a user may select "vocal microphone." As a result, the interface 210 may transmit a mode setting signal 312 to audio subsystem 205. Based on receiving, for example, a "vocal microphone" mode setting signal, audio subsystem 205 may configure algorithm modules 314-328 corresponding to input device 212 with preconfigured parametric equalization, compression, gain, noise gate, etc., settings.

Audio subsystem 205 may provide an output of the recorded sample of the audio signal (step 407). In an example, the output may comprise providing a playback of the recorded audio signal to the user via the output device 214. For example, audio subsystem 205 may provide a playback of the recorded sample of the audio signal so that the user may manually configure the modules 314-328. The output may optionally (or additionally) comprise providing an indication to the user, via the user interface 210, which may be a graphical user interface, of a suggested configuration of one audio processing algorithm module or a suggested configuration of multiple audio processing algorithm modules based on the analysis of the recorded audio signal (step 408). For example, based on the analysis of the recorded audio signal, the low-range frequencies may be introducing too much bass to the signal, distorting the sound signal and making it unusable for podcasting or recording vocals. An example indication that audio signal optimizer 200 may provide to user interface 210 may include as follows: "Apply 150 Hz high pass filter."

A user may wish to iteratively perform the audio signal optimization until a desired tonal quality is achieved. As a result, the audio signal optimizer 200 may receive an indication from the user interface 210 to re-initiate the audio signal optimization (step 409: YES). Based on receiving the indication, the interface controller 202 may then access memory 203 and retrieve instructions associated with prompting the user to begin input from the input device 212. The interface controller 202 may then send instructions to user interface 210 to prompt the user to begin input from input device 212 (step 402). Each step may repeat as necessary until the user terminates the audio signal optimization (step 409: NO). The user may terminate the audio signal optimization if the user is satisfied with the tonal qualities of the audio signal as a result of the audio signal optimization. The audio signal optimizer may apply the updated configurations of modules 314-328 to continued and/or future recording and/or performances, thus affecting the tonal qualities of the audio signals generated by input device 212 as the user continues to record, stream, or broadcast audio. The audio signal optimizer may store the updated configurations of modules 314-328 in database 208 and apply the updated configurations to continued and/or future audio signals generated by input device 212. During the podcasting, broadcasting, live streaming, recording, etc., event, the user may select an indication on user interface 210 to re-initiate the audio signal optimization, if for example, the user changes environments (e.g., moves from indoors to outdoors, or vice versa) or if unwanted noise enters the acoustic environment (e.g., a train or loud car passes by).

Users may be new to streaming audio, broadcasting or recording audio, such as vocals, and might not be familiar with audio engineering techniques such as LKFS thresholds, parametric equalization, compression, or limiting. In an example, the audio signal optimizer may automatically analyze a sample of the audio signal generated by input device 212 and automatically configure DSP 306, including audio signal processing algorithm modules 314-328, based on at least the analysis of the sample of the audio signal.

In an example, a user may wish to quickly test the audio quality before commencing a live stream, a podcast recording, a broadcast, or an audio recording (e.g., perform a sound check). The audio signal optimizer may perform an audio signal optimization quickly (e.g., in a few seconds or less) before a live streaming, podcasting, broadcasting, recording, etc., event begins. As discussed herein, a user may select an indication via user interface 210 to initiate an audio signal optimization. However, a user might not be required to select an indication to initiate an audio signal optimization. In an example, the audio signal optimizer may perform an audio signal optimization in an automated manner as a result of a user launching a software application capable of performing the operations described herein. For example, upon launch of the software application, the audio signal optimizer may apply any number of configurations of modules 314-328 to the incoming audio signal of input device 212 irrespective of whether a sample of audio has been recorded.

FIG. 5 illustrates an example flow chart of a method 500 that may be performed. Some or all of the steps may be performed by an audio signal optimizer 200 housed in input device 212 (such as the microphone 100), and some or all of the steps may be performed by an audio signal optimizer 200 house in a device connected to the microphone 100 (such as desktop 102 or mobile phone 104). While the method shows particular steps in a particular order, the method may be further subdivided into additional sub-steps, steps may be combined, steps may be omitted, and the steps may be performed in other orders without necessarily deviating from the concepts described herein. Steps illustrated by a dotted line indicate that the steps may be omitted without necessarily deviating from the concepts described herein.

In operation, the interface controller 202 may receive an indication from user interface 210 to initiate an audio signal optimization (step 501, FIG. 5). The audio signal optimizer 200 may then send instructions to user interface 210 to prompt the user to begin input from input device 212 (step 502). The audio signal optimizer 200 may then receive input from input device 212 via device controller 201 as an analog audio signal (step 503), and may record a sample of the audio signal and cache the sample of the audio signal in memory 203 (step 504).

Signal analyzer 305 of audio subsystem 205 may then analyze the sample of the audio signal for a predetermined audio parameter or a set of audio parameters (step 505). As discussed herein, "audio parameter(s)" refers to a particular characteristic of the audio signal that may correspond to audio signal processing algorithm modules 314-328. For example, the audio parameter of loudness may correspond to the loudness analyzer 324, while the audio parameter of frequency curve may correspond to any of the equalizers 314, 316 or 318, and so on. In an example, signal analyzer 305 may perform a fast Fourier transform on the sample of the audio signal to translate the waveform of the audio signal into a frequency spectrum, thus providing a frequency curve that may be further configurable by parametric equalizers 314, 316, and 318. Signal analyzer 305 of audio signal optimizer 200 may also analyze a particular audio parameter based on a user selectable mode-setting signal 312.

Based on the analysis of the audio signal and mode-setting signal (if applicable), the audio signal optimizer 200 may automatically configure any number of audio signal processing algorithm modules 314-328 (step 506). The audio signal optimizer 200 may optionally provide instructions to the user interface 210 to indicate to the user that certain audio signal processing algorithm modules have been configured (step 507). The instructions may include information relating to which particular audio signal processing algorithm modules 314-328 have been updated, including an indication of the values by which a particular audio signal processing algorithm module has been updated. For example, based on a configuration of the compressor 320, an example indication may include as follows: "Compression settings updated: Frequency: 200 Hz; Attack: 10 ms; Threshold: −17 dB; Ratio: 4 dB." Another example indication may include displaying a graphical representation of a configuration of parametric equalizer 316 via user interface 210.

The audio signal optimizer 200 may optionally provide an output of the optimized recorded audio signal to output device 214 (step 508) (i.e., the output signal comprises the recorded audio signal with any configurations of modules 314-328 applied to the audio signal output). A user may wish to iteratively perform the audio signal optimization until a desired tonal quality of the audio signal is achieved. As a result, the audio signal optimizer 200 may receive an indication from the user interface 210 to re-initiate the audio signal optimization (step 509: YES). Based on receiving the indication, the interface controller 202 may then access memory 203 and retrieve instructions associated with prompting the user to begin input from the input device 212. The interface controller 202 may then send instructions to user interface 210 to prompt the user to begin input from input device 212 (step 502). Each step may repeat as necessary until the user terminates the audio signal optimization (step 509: NO). The user may terminate the audio signal optimization if the user is satisfied with the tonal qualities of the audio signal as a result of the audio signal optimization. The user may wish for the audio signal optimizer to apply the updated configurations of modules 314-328 to continued and/or future recording and/or performances. The audio signal optimizer may store the updated configurations of modules 314-328 in database 208 and apply the updated configurations to continued and/or future audio signals generated by input device 212. During the podcasting, broadcasting, live streaming, recording, etc., event, the user may select an indication on user interface 210 to re-initiate the audio signal optimization, if for example, the user changes environments (e.g., moves from indoors to outdoors, or vice versa, or moves from different indoor settings, e.g., from a basement to a living room) or if unwanted noise enters the acoustic environment (e.g., a train or loud car passes by).

In an example, the audio signal optimizer 200 may automatically perform an audio signal optimization with or without a user indication to initiate an audio signal optimization. For example, a user may be creating content in an outdoor environment where there may be many sudden and unexpected noises that may affect the quality of the recorded audio (e.g., a passing train or a crowd of pedestrians). Unwanted noise of this type may typically be represented by certain frequencies or frequency ranges having amplitudes that rise above a predetermined threshold. Signal analyzer 305 may constantly sample frames of the audio signal for these unwanted frequencies while the user is actively recording or performing. Upon detecting an unwanted frequency, the audio signal optimizer 200 may configure modules 314-328 of DSP 306 to mitigate or attenuate these unwanted frequencies with or without user intervention.

The aspects described herein may be performed by a number of device configurations. For example, a user may connect input device 212 (such as microphone 100) to devices 102, 104, and/or other devices operating a software application capable of performing the operations described herein. In an example, the aspects described herein can be performed by a smartphone, desktop computer, laptop computer, and/or other devices having an internal microphone and a software application capable of performing the operations described herein. Some or all of the aspects described herein may be performed by firmware applications intended to run without an operating system, such as an ASIC or a DSP chip configured to perform the operations described herein natively or by the control of an operating system, etc. No other audio equipment might be necessary to perform the operations described herein.

A user may wish to connect multiple input devices to the audio signal optimizer, such as in a recording studio, radio broadcasting environment, podcasting environment, or in a concert venue or environment where multiple sources of audio are required. For example, a podcaster may wish to ensure that incoming vocals and an audio track are balanced such that the loudness of the audio does not overcome the vocals. In another example, a band performing a live concert may wish to optimize the tonal characteristics of each instrument and track and set proper gain levels (i.e., perform a sound check) before beginning the performance.

Figure 6:
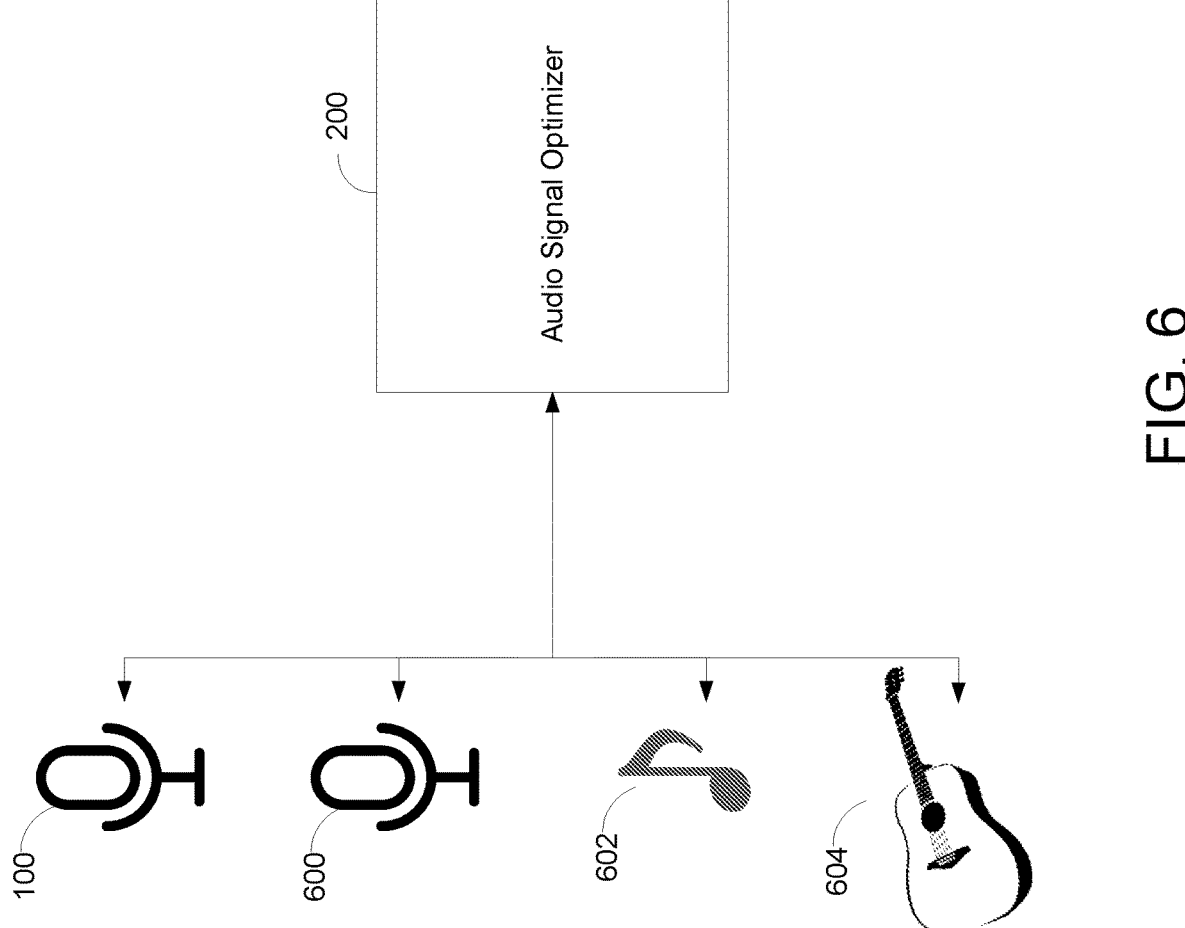
FIG. 6 illustrates another example audio signal optimizer that may be used to implement one or more illustrative aspects described herein.

FIG. 6 illustrates an example block diagram whereby multiple input devices are connected to the audio signal optimizer 200. In an example, the input devices may include microphone 100, microphone 600, audio track 602, and/or musical instrument 604. Microphones 100 and 600 may include any number of microphone types, including a condenser microphone (including large- and small-diaphragm and electret condenser), a dynamic microphone (including moving coil and ribbon microphones), a MEMS microphone, etc. Audio track 602 may include a digital audio track (mp3, etc.), an analog audio track (vinyl, cassette, etc.), or a line input. Musical instrument 604 may include a guitar, a keyboard, drums, or other musical instruments. In other examples, the input devices may include more or fewer microphones, more or fewer audio tracks, and/or more or fewer musical instruments. The input devices may connect to the audio signal optimizer using any one of a variety of different connectors, including a LEMO connector, an XLR connector, a TQG connector, a TRS connector, a USB, or RCA connectors. The input devices also be wireless and connect to the audio signal optimizer through any one of a variety of protocols, including WiMAX, LTE, Bluetooth, Bluetooth Broadcast, GSM, 3G, 4G, 5G, Zigbee, 60 GHz Wi-Fi, Wi-Fi (e.g., compatible with IEEE 802.11a/b/g/n/ac/ ad/af/ah/ai/aj/aq/ax/ay/ba/be), NFC protocols, proprietary wireless connection protocols, and/or any other protocol. Where the connection is wireless, the input devices (and/or their respective transmitters, receivers, or transceivers) and the audio signal optimization module may include a wireless communications interface.

Figure 7:
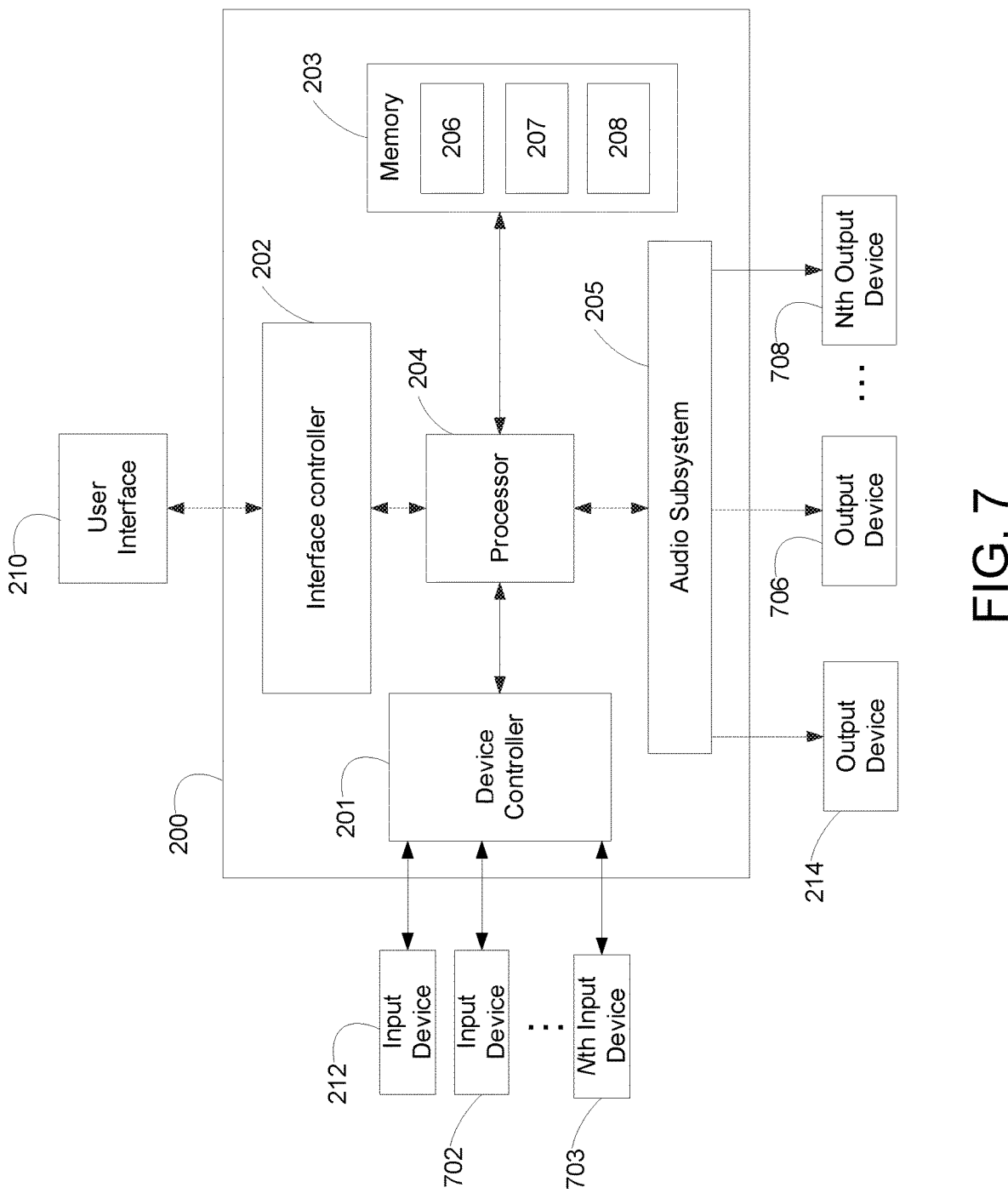
FIG. 7 illustrates an example block diagram of the example audio signal optimizer of FIG. 6.

FIG. 7 illustrates an example audio signal optimizer 200 configured to receive a plurality of audio signals from a plurality of input devices, analyze each audio signal, and, based on the analysis, optimize at least one audio parameter of each audio signal, and balance the gain levels of the plurality of audio signals among one another to create a balanced mix of audio output. Audio signal optimizer 200 may include a device controller 201. Device controller 201 may be configured to interface with a plurality of input devices, including input device 212, input device 702, and an nth input device 703. As discussed, the input devices may include a plurality of microphones, audio tracks, or musical instruments. Device controller 201 and audio subsystem 205 may be able to simultaneously accept, for example, multiple microphone inputs, a combination of microphone input and line inputs, or multiple line inputs. The audio signal optimizer 200 may be any type of computing device, and may be physically implemented as a single unit or a system of multiple interacting units. For example, the audio signal optimizer 200 may comprise one or more smart phones, one or more tablet computers, one or more laptop computer, one or more desktop computers, and/or one or more items of audio equipment that have computing functionality, etc.

Figure 8:
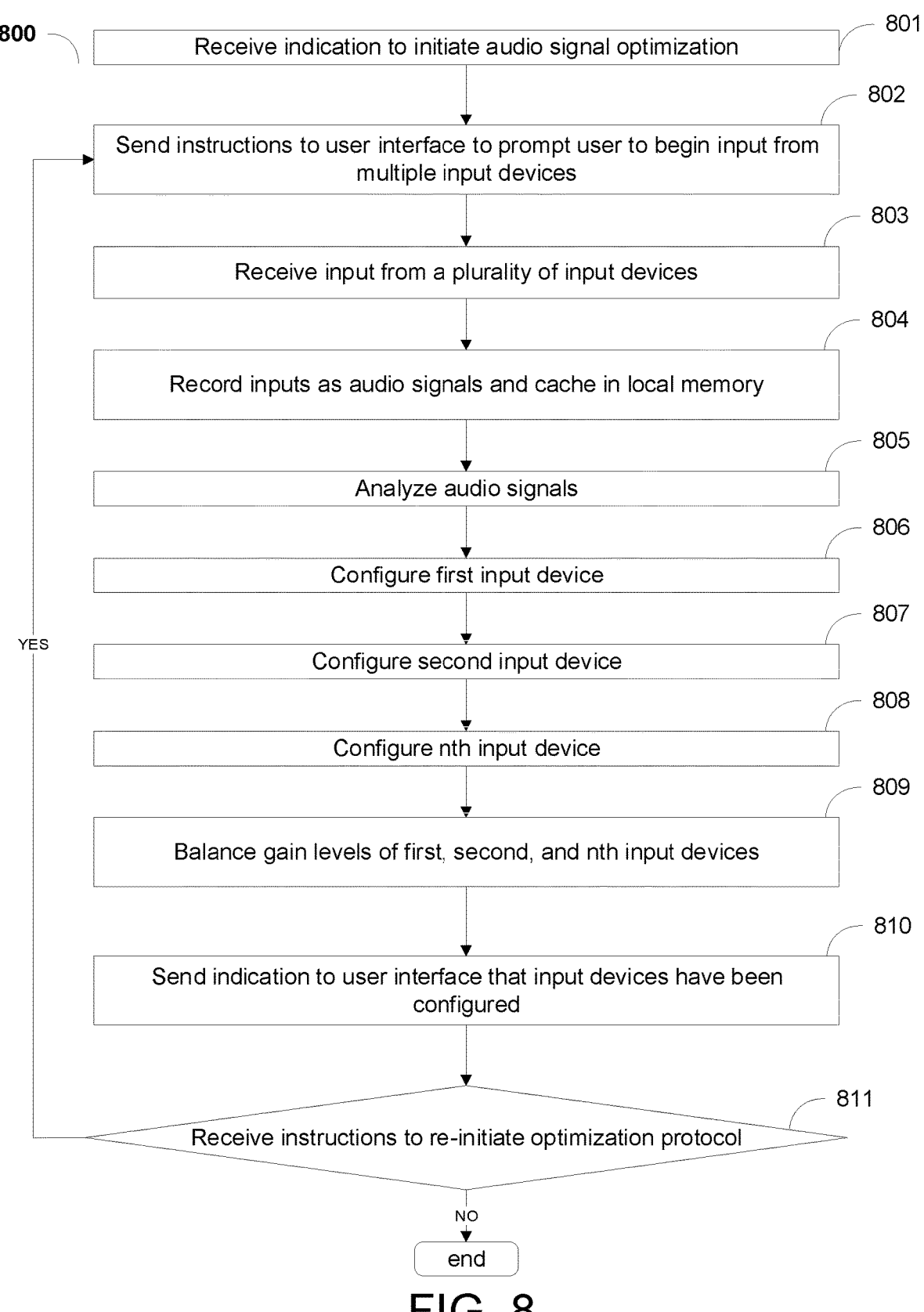
FIG. 8 illustrates another example flow chart of a method that may be performed to implement one or more illustrative aspects described herein.

FIG. 8 illustrates an example flow chart of a method 800 for optimizing and balancing the gain levels of multiple audio signals generated by multiple input devices. Some or all of the steps may be performed by an audio signal optimizer 200 housed in input device 212 (such as the microphone 100 or 600), and some or all of the steps may be performed by an audio signal optimizer 200 housed in a device connected to the microphones 100 and 600 (such as desktop 102 or mobile phone 104). While the method shows particular steps in a particular order, the method may be further subdivided into additional sub-steps, steps may be combined, steps may be omitted, and the steps may be performed in other orders without necessarily deviating from the concepts described herein. Steps illustrated by a dotted line indicate that the steps may be omitted without necessarily deviating from the concepts described herein.

In operation, the interface controller 202 may receive an indication from user interface 210 to initiate an audio signal optimization (step 801, FIG. 8). The interface controller 202 may access memory 203 and retrieve instructions associated with prompting the user(s) to begin input from the input devices 212, 702, and/or 703. The interface controller 202 may send instructions to user interface 210 to prompt the user(s) to begin input from input devices 212, 702, and/or 703 (step 802). The audio signal optimizer 200 may receive input from input devices 212, 702, and/or 703 as either analog or digital audio signals, as the case may be (step 803), and may record samples of each audio signal and cache the samples of each audio signal in memory 203 (step 804). Signal analyzer 305 of audio signal optimizer 200 may analyze each audio signal for a predetermined audio parameter or a set of audio parameters in accordance with methods described herein (step 805).

Based on the analysis, the audio signal optimizer 200 may automatically configure any number of audio signal processing algorithm modules 314-328 (steps 806-808) corresponding to input devices 212, 702, and 703. Memory 203 may include preconfigured audio parameter profiles that correspond to input device types. For example, if a microphone input device type and an audio track input device are detected, audio signal optimizer 200 may apply a preconfigured audio parameter profile to audio subsystem 205 whereby various settings corresponding to algorithm modules 314-218 are applied to the microphone and may be different than those applied to the audio track. Memory 203 may include preconfigured equalization curves that correspond to input device types. For example, as a result of detecting a guitar input device type or otherwise receiving an indication from the user that the input device type is a guitar, the audio signal optimizer may configure DSP 306 with the preconfigured equalization curve.

Audio signal optimizer 200 may balance the gain levels of input devices 212, 702, and 703 to create a balanced mix of audio output (step 809). Audio signal optimizer 200 may automatically balance the gain levels of input devices 212, 702, and 703 based on analysis of each signal. Memory 203 may include preconfigured audio parameter profiles that correspond to input device types. For example, if a microphone input device type and an audio track input device are detected, audio signal optimizer 200 may apply a preconfigured audio parameter profile to audio subsystem 205 whereby the gain level and loudness level of the microphone are configured higher than those of the audio track. In another example, the audio signal optimizer 200 may balance the gain levels of input devices 212, 702, and 703 based on a user indication. For example, the user interface 210 may present a user with virtual selection means indicative of one or more pre-configured DSP mode settings, including "podcast," "voice recording," "instrument and vocals," etc. In an example, the user may select "podcast" DSP mode. The user selection may cause the interface 210 to transmit mode setting signal 312 to audio subsystem 205. Memory 203 may include preconfigured audio parameter profiles that correspond to a given mode setting signal 312. For example, based on receiving a "podcast" mode setting signal, audio subsystem 205 may configure algorithm modules 314-328 corresponding to input devices 212 and 702 with preconfigured parametric equalization, compression, gain, noise gate, etc., settings. It is to be understood that steps 806-809 may be performed in any given order. In an example, the audio signal optimizer 200 may perform steps 805-808 in parallel with step 809. Processor 204 coupled to memory 203 may control the overall operation of the audio signal optimizer 200 as it performs steps 801-811.

The audio signal optimizer 200 may send instructions to the user interface 210 to indicate to the user that certain audio signal processing algorithm modules 314-328 corresponding to input devices 212, 702, and 703 have been configured (step 810). The instructions may include information relating to which particular audio signal processing algorithm modules 314-328 have been updated, including an indication of the values by which a particular audio signal processing algorithm module has been updated. Audio subsystem 205 may optionally provide an output of the optimized recorded samples of the audio signals to output devices 214, 706, and 708 (not shown). In an example, output devices 214, 706, and 708 may be personal monitoring devices, such as in-ear monitors or other output devices suited for monitoring audio. Audio subsystem 205 may route the optimized recorded sample of the audio signal from input device 212 to output device 214, the optimized recorded sample of the audio signal from input device 702 to output device 706, and the optimized recorded sample of the audio signal from input device 703 to output device 708. Audio subsystem 205 may route the optimized recorded samples of audio signals from input devices 212, 702, and/or 703 to any combination of output devices 214, 706, and/or 708.

Interface controller 202 may receive an indication from user interface 210 to re-initiate the audio signal optimization (step 811: YES). As a result, the interface controller 202 may access memory 203 and retrieve instructions associated with prompting the user(s) to begin input from the input devices 212, 702, and/or 703. The interface controller 202 may send instructions to user interface 210 to prompt the user(s) to begin input from input devices 212, 702, and/or 703 (step 802). Each step may repeat as necessary until the user(s) terminates the audio signal optimization (step 811: NO).

A method for optimizing an audio signal may comprise receiving, by an audio signal optimizer, a first indication to perform a first audio signal optimization, receiving a first audio signal from an input device, performing, based on an analysis of the first audio signal, the first audio signal optimization, providing an output of the recorded sample of the first audio signal, wherein the output of the recorded sample of the audio signal may comprise at least one of playback of the recorded sample of the first audio signal or an audio parameter update for at least one characteristic associated with the audio signal, and receiving, from the input device, a second audio signal that may be optimized relative to the first audio signal and may be based on the output of the recorded sample of the first audio signal. The method may further comprise performing a second audio signal optimization based on the playback of the sample of the first audio signal. The method may further comprise receiving a second indication to perform the first audio signal optimization. The second indication may comprise a user-selected configuration mode of a digital signal processing module and wherein the first audio signal optimization may further comprise application of the user-selected configuration mode. The input device may comprise a microphone. The audio parameter update may comprise at least one of: a parametric equalizer configuration, a gain level configuration, a signal compressor configuration, a noise gate configuration, or a de-noiser configuration. The second audio signal may comprise a second audio quality that is optimized relative to a first audio quality of the first signal, and wherein a difference between the second audio quality and the first audio quality may be based on the suggested audio parameter update.

A method for optimizing an audio signal may comprise receiving, by an audio signal optimizer, a first indication to perform an audio signal optimization, receiving an audio signal from an input device, recording a sample of the audio signal, analyzing the sample of the audio signal for at least one audio parameter, and performing, based on an analysis of the sample of the audio signal, the audio signal optimization of the audio signal, wherein the audio signal optimization comprises a configuration of a gain level of the audio signal. The method may further comprise providing a second indication comprising at least one of an indication that the audio signal optimization has been performed, or an indication of an update to the at least one audio parameter. The method may further comprise receiving a second indication comprising a user-selected configuration mode of a digital signal processing module and wherein the audio signal optimization further comprises application of the user-selected configuration mode. The audio signal optimization may further comprise at least one of: a parametric equalization configuration, a signal compression configuration, a de-noiser configuration, or a noise gate configuration. The method may further comprise receiving a second audio signal from a second input device, recording a sample of the second audio signal, analyzing the sample of the second audio signal for a second audio parameter, and performing, based on an analysis of the sample of the second audio signal, the audio signal optimization, wherein the audio signal optimization comprises at least one of: a gain level, a parametric equalizer, a signal compressor, or a noise gate. The method may further comprise balancing a first gain level of the at least one audio signal with a second gain level of the second audio signal. The second input device may comprise at least one of an audio track or a musical instrument. The at least one input device may comprise a microphone.

An apparatus may comprise one or more processors; and memory storing instructions that, when executed by the one or more processors, cause the apparatus to initiate, based on a first indication, an audio signal optimization; receive an audio signal from an input device; record a sample of the audio signal; analyze the sample of the audio signal for at least one audio parameter associated with the sample of the audio signal; and perform, based on an analysis of the sample of the audio signal, the audio signal optimization, wherein the audio signal optimization comprises a configuration of a gain level of the audio signal. The instructions, when executed by the one or more processors, may further cause the apparatus to provide a second indication to a user, via a graphical user interface, wherein the second indication comprises at least one of: an indication that the audio signal optimization has been performed; or an indication of an update to the at least one audio parameter. The audio signal optimization may further comprise at least one of: a parametric equalization, a signal compression, or a noise gate. The apparatus may comprise a microphone. The instructions, when executed by the one or more processors, may further cause the apparatus to: receive a second audio signal from a second input device; analyze the second audio signal for a second audio parameter; and perform, based on the analysis of the second sample of the second audio signal, the audio signal optimization, wherein the audio signal optimization comprises at least one of: a gain level, a parametric equalizer, a signal compressor, or a noise gate. The instructions, when executed by the one or more processors, may further cause the apparatus to balance a first gain level of the at least one audio signal with a second gain level of the second audio signal. The second input device may comprise at least one of: a microphone, an audio track, or a musical instrument. The one or more processors and memory may be housed in a microphone.

In the foregoing specification, the present disclosure has been described with reference to specific exemplary examples thereof. Although the invention has been described in terms of a preferred example, those skilled in the art will recognize that various modifications, examples or variations of the invention can be practiced within the spirit and scope of the invention as set forth in the appended claims. The specification and drawings are, therefore, to be regarded in an illustrated rather than restrictive sense. Accordingly, it is not intended that the invention be limited except as may be necessary in view of the appended claims.

The invention claimed is:

1. A method for optimizing an audio signal comprising:
   receiving, by an audio signal optimizer, a first indication to perform a first audio signal optimization;
   receiving a first audio signal from an input device;
   performing, based on an analysis of the first audio signal, the first audio signal optimization;

configuring, based on the first audio signal optimization, at least one acoustic parameter;
providing an output of a sample of the first audio signal optimization, wherein the output of the sample of the first audio signal optimization comprises a visual indication of the configured at least one acoustic parameter; and
after providing the visual indication, receiving, from the input device, a second audio signal processed based on the configured at least one acoustic parameter.

2. The method of claim 1, further comprising receiving a second indication to perform the first audio signal optimization, the second indication comprising a user-selected configuration mode of a digital signal processing module and wherein the first audio signal optimization further comprises application of the user-selected configuration mode.

3. The method of claim 1, further comprising performing a second audio signal optimization based on a playback of the sample of the first audio signal optimization.

4. The method of claim 1, wherein the configured at least one acoustic parameter comprises at least one of: a parametric equalizer configuration, a gain level configuration, a signal compressor configuration, a noise gate configuration, or a de-noiser configuration.

5. The method of claim 1, wherein the second audio signal comprises a second audio quality that is optimized relative to a first audio quality of the first audio signal, and wherein a difference between the second audio quality and the first audio quality is based on the configured at least one acoustic parameter.

6. A method for optimizing an audio signal comprising:
   receiving, by an audio signal optimizer, a first indication to perform an audio signal optimization;
   receiving an audio signal from an input device;
   recording a sample of the audio signal;
   analyzing the sample of the audio signal for at least one audio parameter;
   performing, based on an analysis of the sample of the audio signal, the audio signal optimization, wherein the audio signal optimization comprises a configuration of a gain level of the audio signal; and
   outputting a visual indication, wherein the visual indication indicates a suggested parameter update for at least one setting associated with an audio processing algorithm.

7. The method of claim 6, wherein the audio signal is a first audio signal, and wherein the method further comprises:
   after application of the suggested parameter update to the at least one setting associated with the audio processing algorithm, processing a second audio signal using the audio processing algorithm.

8. The method of claim 6, further comprising receiving a second indication comprising a user-selected configuration mode of a digital signal processing module, wherein the audio signal optimization further comprises application of the user-selected configuration mode.

9. The method of claim 6, wherein the audio signal optimization further comprises at least one of: a parametric equalization configuration, a signal compression configuration, a de-noiser configuration, or a noise gate configuration.

10. The method of claim 6, wherein the audio signal is a first audio signal, and wherein the method further comprises:
   receiving a second audio signal from a second input device;
   recording a sample of the second audio signal;

analyzing the sample of the second audio signal for a second audio parameter; and performing, based on an analysis of the sample of the second audio signal, audio signal optimization of the second audio signal, wherein the audio signal optimization of the second audio signal comprises at least one of: a gain level, a parametric equalizer, a signal compressor, or a noise gate.

11. The method of claim 10, further comprising balancing a first gain level of the first audio signal with a second gain level of the second audio signal.

12. The method of claim 10, wherein the second input device comprises at least one of an audio track or a musical instrument.

13. The method of claim 6, wherein the input device comprises a microphone.

14. An apparatus comprising:

one or more processors; and memory storing instructions that, when executed by the one or more processors, cause the apparatus to:

initiate, based on a first indication, an audio signal optimization;

receive an audio signal from an input device;

record a sample of the audio signal;

analyze the sample of the audio signal for at least one audio parameter associated with the sample of the audio signal;

perform, based on an analysis of the sample of the audio signal, the audio signal optimization, wherein the audio signal optimization comprises a configuration of a gain level of the audio signal; and output a visual indication, wherein the visual indication indicates a suggested parameter update for at least one setting associated with an audio processing algorithm.

15. The apparatus of claim 14, wherein the audio signal is a first audio signal, and wherein the instructions, when executed by the one or more processors, further cause the apparatus to:

after application of the suggested parameter update to the at least one setting associated with the audio processing algorithm, process a second audio signal using the audio processing algorithm.

16. The apparatus of claim 14, wherein the audio signal optimization further comprises at least one of: a parametric equalization, a signal compression, or a noise gate.

17. The apparatus of claim 14, wherein the audio signal is a first audio signal, and wherein the instructions, when executed by the one or more processors, further cause the apparatus to:

receive a second audio signal from a second input device;

analyze the second audio signal for a second audio parameter; and perform, based on the analysis of the second audio signal, audio signal optimization of the second audio signal, wherein the audio signal optimization of the second audio signal comprises at least one of: a gain level, a parametric equalizer, a signal compressor, or a noise gate.

18. The apparatus of claim 17, wherein the instructions, when executed by the one or more processors, further cause the apparatus to balance a first gain level of the first audio signal with a second gain level of the second audio signal.

19. The apparatus of claim 17, wherein the second input device comprises at least one of: a microphone, an audio track, or a musical instrument.

20. The apparatus of claim 14, wherein the one or more processors and memory is housed in a microphone.

* * * * *